(12) United States Patent
Gerlach

(10) Patent No.: US 10,715,771 B1
(45) Date of Patent: Jul. 14, 2020

(54) WIDE-GAMUT-COLOR IMAGE FORMATION AND PROJECTION

(71) Applicant: Gerlach Consulting Group, Inc., Draper, UT (US)

(72) Inventor: Robert Gerlach, Draper, UT (US)

(73) Assignee: Gerlach Consulting Group, Inc., Draper, UT (US)

( * ) Notice: Subject to any disclaimer, the term of this patent is extended or adjusted under 35 U.S.C. 154(b) by 283 days.

(21) Appl. No.: 15/267,109

(22) Filed: Sep. 15, 2016

(51) Int. Cl.
| | |
|---|---|
| *H04N 9/64* | (2006.01) |
| *H04N 9/083* | (2006.01) |
| *H04N 9/76* | (2006.01) |
| *G02B 26/00* | (2006.01) |

(52) U.S. Cl.
CPC ........... *H04N 9/646* (2013.01); *G02B 26/008* (2013.01); *H04N 9/083* (2013.01); *H04N 9/76* (2013.01)

(58) Field of Classification Search
CPC .......... H04N 9/646; H04N 9/76; H04N 9/083; G02B 26/008
See application file for complete search history.

(56) References Cited

U.S. PATENT DOCUMENTS

| | | | |
|---|---|---|---|
| 6,700,690 B1 * | 3/2004 | Buchsbaum | G02B 5/20 359/230 |
| 6,870,523 B1 | 3/2005 | Ben-David et al. | |
| 7,113,152 B2 | 9/2006 | Ben-David et al. | |
| 7,165,847 B2 | 1/2007 | Pettitt | |
| 7,859,554 B2 | 12/2010 | Young | |
| 8,289,344 B2 | 10/2012 | Marcu et al. | |

(Continued)

OTHER PUBLICATIONS

Zulch, Richard C., The Color Science of Terachrome, web page retrieved from http://terachrome.com/web/tech-colorscience.html on Dec. 1, 2013, Copyright 2011.

(Continued)

*Primary Examiner* — Lin Ye
*Assistant Examiner* — Tuan H Le

(57) ABSTRACT

Apparatus for capturing a wide-color-gamut image includes a broadband electronic image sensor; optics gathering light from a scene and focusing an image formed by the gathered light along a light path onto the electronic image sensor; a filter interposed in the light path, constructed and arranged so as to allow individual wavelengths of the wide-gamut-color to pass through it in narrow bands of wavelengths having bandwidths narrower than a few tens of nanometers at each point in time; and a processor connected to the image sensor to capture a sequence of images synchronous with each narrow-band wavelength passed by the filter at each point in time, the processor combining the sequence of images into the wide-gamut-color image. Apparatus for projecting a wide-gamut-color image includes a wide-spectrum image source; optics projecting light from the image source to a display surface along a light path; a filter unit interposed in the light path, constructed and arranged so as to allow each individual wavelength of the wide-gamut-color to pass through it one, narrow-band wavelength at each point in time; and a processor connected to the image source to present a sequence of images synchronous with each narrow-band wavelength passed by the filter at each point in time, thus projecting the wide-gamut-color image.

9 Claims, 12 Drawing Sheets

(56) References Cited

U.S. PATENT DOCUMENTS

| | | | |
|---|---|---|---|
| 8,294,739 | B2 | 10/2012 | Tomizawa et al. |
| 8,295,594 | B2 | 10/2012 | Brown Elliott et al. |
| 8,711,168 | B2 | 4/2014 | Richards |
| 2006/0158881 | A1 | 7/2006 | Dowling |
| 2007/0103646 | A1 | 5/2007 | Young |
| 2010/0097406 | A1 | 4/2010 | Zulch |
| 2010/0097407 | A1 | 4/2010 | Zulch |
| 2010/0171444 | A1 | 7/2010 | Bennette |
| 2010/0188022 | A1 | 7/2010 | Gerlach et al. |
| 2011/0012512 | A1 | 1/2011 | Young |
| 2011/0157245 | A1 | 6/2011 | Young |
| 2012/0176042 | A1 | 7/2012 | Hatley et al. |
| 2012/0176063 | A1 | 7/2012 | Hatley et al. |
| 2014/0187968 | A1* | 7/2014 | Pinho .................. A61B 5/0059 600/476 |
| 2015/0145978 | A1* | 5/2015 | Chiba ................ G02B 23/2484 348/65 |

OTHER PUBLICATIONS

Zulch, Richard C., U.S. Appl. No. 12/387,468 file history.

Juckett, Ryan., RGB Color Space Conversion, web page retrieved from http://www.ryanjuckett.com/programming/rgb-color-space-conversion/?tmpl=component&print=1&layout=default&page= on Jan. 4, 2013, dated May 16, 2010.

What is wide color gamut (WCG)?, ClNet, Mar. 20, 2017, at https://www.cnet.com/how-to/what-is-wide-color-gamut-wcg/, viewed Mar. 4, 2020.

* cited by examiner

FIG. 1

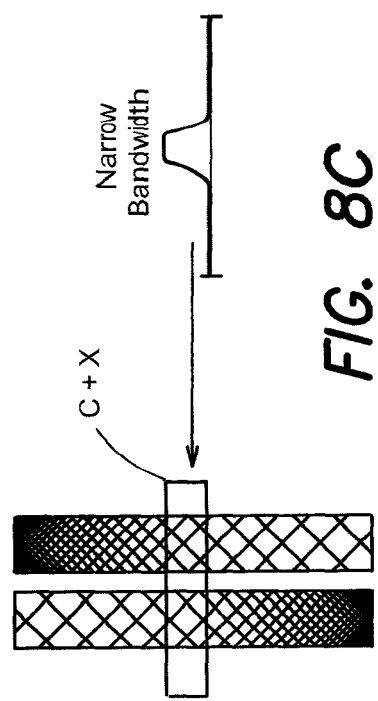
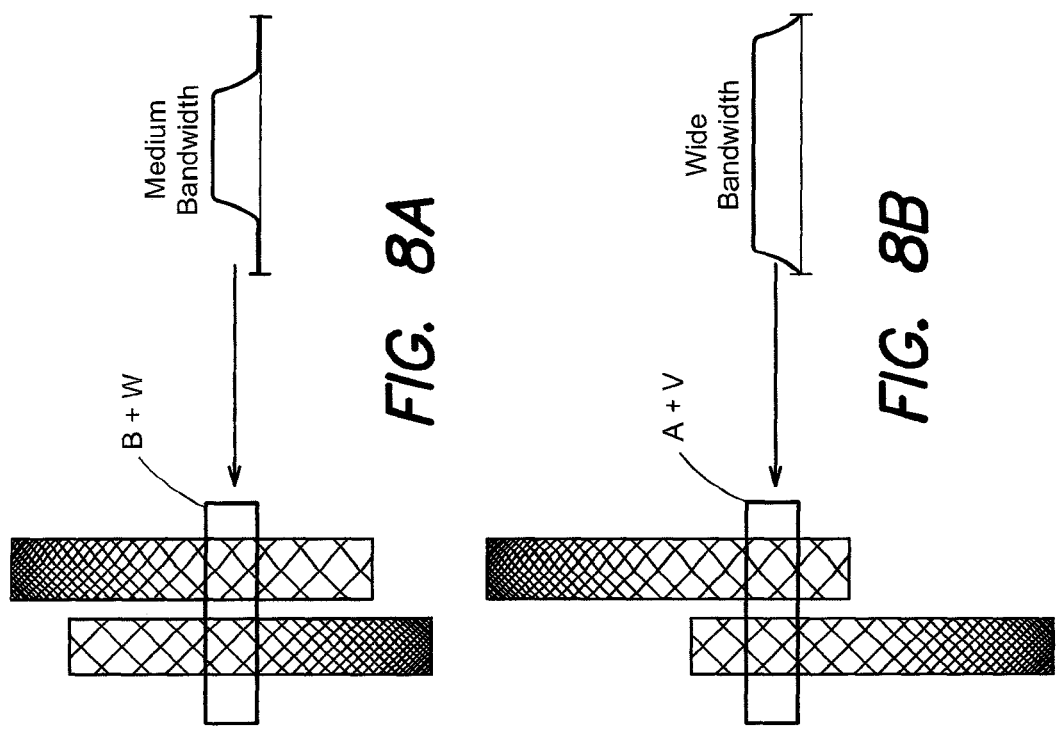

WIDE-GAMUT-COLOR IMAGE FORMATION AND PROJECTION

BACKGROUND

The present invention relates to the formation, processing, and projection or display of wide-gamut-color images. Conventional images, including wide-gamut-color images, are formed using three or more primary colors that are combined in various proportions to form a gamut of colors that include a fraction of the full gamut of all possible colors in nature, fewer than all colors in the full gamut. A primary color is one of a set of colors whose perceived central wavelength is used to define an apex of a polygon or surface that defines the gamut of colors represented by the set of primary colors. In the limit, as the number of "primary" colors is increased toward infinity, the system may be referred to as primary-less. One primary-less system would be a system which can represent color using all the colors defining the boundary of the full gamut of all possible colors in nature, and thus represent all the colors within that full gamut of all possible colors in nature.

Collecting and directing light from a scene onto a sensor whose picture elements are overlaid with a color filter array arranged to divide each picture element into regions sensitive to each of the three or more primary colors photographically produces conventional digital three-primary and higher-order images. That is, a sensor is divided into picture elements, and the picture elements are further divided into three or more regions. The regions are each covered by a filter rendering each individual region sensitive to substantially one color. By one color, a single wavelength (or, inversely, frequency) of light might be meant, but in practical filters and systems one color may be a narrow band centered around a central wavelength, a broadband light having a principle observable color at the central wavelength either due to the energy being highest at or near the central wavelength, or due to averaging of the broadband light at the sensor (e.g. an observer's eye). A portion of a filtered broadband light source perceived or detected as "blue," for example, may be at a discrete wavelength defined as "blue," may cover a range of wavelengths having a distribution perceived or detected as "blue" due to averaging at the sensor, or may include a number of discrete spectral elements that when combined at the sensor are perceived or detected as "blue." The visible spectrum includes wavelengths of about 380 nanometers (nm) through 800 nm. Broadband "red," "green," and "blue" filters roughly matching the sensitivity of human sight might cover bands of 615-675 nm, 510-560 nm, and 440-480 nm, respectively, for example. Narrowband filters for "red," "green," and "blue" might cover a few nm to a few tens of nm around the central values of 635 nm, 540 nm, and 460 nm. Popular color filter arrays for use in consumer and professional three-color systems include the Bayer array, the Fujifilm ExR array, the Fujifilm X-trans array, and various RGBW arrays. The Bayer array layout is illustrated in FIG. 1. In conventional sensors and color filter arrays, light of each primary color (± a few nm to a few tens of nm) from each part of a scene is collected and sensed by regions much smaller in area than the area of each picture element, since each picture element is divided into a number of regions at least equal to the number of primary colors required to represent the gamut. Alternatively, collecting and directing light from a scene onto film whose three or more layers are sensitive to, or filtered to receive three or more primary colors photographically produce conventional film-based three-primary and higher order images.

Conventional three-primary and higher-order images are projected or displayed by activating sources of light of the three or more primary colors in an arrangement that forms a two-dimensional viewing array of picture elements, each of which combines the three or more primary colors to produce a desired spot color at each of the projected or displayed picture element locations. As with the sensors for producing images represented by picture elements having three or more primary colors, such projection systems require displays with either spatial or temporal resolution, i.e., image bandwidth, substantially higher than the desired number of picture elements, to provide the requisite number of primary colors within each picture element. For example, each picture element may be divided either temporally or spatially into three or more parts, each part passing through a primary-color filter, which parts are then recombined into a single picture element. For example, in a flat panel display, each pixel is divided into three or more sub-pixels, each of which is a different primary color. In many conventional projection systems, though, the primary colors defining each pixel are separated either temporally, e.g., by a rotating color wheel spinning in front of the light source or different colors of LEDs blinking on and off in sequence, or spatially, e.g., by a beam-splitting filter system that separates the light source into three or more beams of different primary colors which then each shine onto a dedicated pixel array such as in a Digital Light Processing (DLP) projector before recombining again using a beam-combining system, or three or more separate light sources, each producing a different primary color, each shining onto a different pixel array before combining into a single image projection. By temporally separating the primary colors corresponding to each pixel, or by spatially separating them using beam splitting, the image bandwidth of the system is increased by a factor equal to the number of primary colors corresponding to each pixel. While each imaging device needs a resolution no greater than the resolution of the final image, the combined resolution is greater by a factor equal to the number of primaries by which the final image is represented. Such dividing and recombining may be achieved using rotating, segmented color wheels or beam splitters for high-, medium-, and low-pass filters—red, green, and blue—and beam-recombining reflectors. Alternatively, a high-bandwidth source of light can be projected through a film whose layers represent the combinations of three or more primary colors throughout a two-dimensional array representing the image.

SUMMARY

Embodiments of the present invention record three-primary and higher-order wide-gamut-color images using a broadband sensor of sufficient resolution and bandwidth before which has been interposed a variable filter which permits each primary color frequency (in a multi-primary-color system) or every color frequency defining points along a boundary of a wide-gamut-color surface (in a primary-less system, as explained in the Background, above) to substantially individually reach the broadband sensor.

Apparatus for capturing a wide-color-gamut image includes: a broadband electronic image sensor; optics gathering light from a scene and focusing an image formed by the gathered light along a light path onto the electronic image sensor; a filter interposed in the light path, constructed and arranged so as to allow individual wavelengths of the wide-gamut-color to pass through it in narrow bands of wavelengths having bandwidths narrower than a few tens of nanometers at each point in time; and a processor connected to the image sensor to capture a sequence of images synchronous with each narrow-band wavelength passed by the filter at each point in time, the processor combining the sequence of images into the wide-gamut-color image. In a variation, the filter is constructed and arranged so as to allow three or more individual narrow bands of wavelengths of the wide-gamut-color to pass through it individually at separate points in time. The filter may further be constructed and arranged so as to allow each individual narrow band of wavelength of the wide-gamut-color continuous surface to pass through it individually at separate points in time. In another variation, the processor further combines plural sequences of images into a continuous video having individual frames, each of which is a wide-gamut-color image. In another variation, the filter may further include: beam splitting optics interposed in the light path, dividing the light path into a plurality of sub-paths; and a plurality of filters, each of the plurality of filters interposed in one of the sub-paths passing different, narrow-band wavelengths in an alternating sequence. The plurality of filters may further comprise a high-pass filter and a low-pass filter. The plurality of filters may yet further comprise: a mounting structure constructed and arranged to move at least one of the plurality of filters relative to another of the plurality of filters to set at least one of a bandwidth and a center frequency of the filter unit. In yet another variation, the filter further comprises: a filter wheel having three or more regions, each having a narrow pass band centered on a wavelength defining an apex of a wide-gamut-color surface. The filter wheel may further comprise: a narrow pass band region at each radial position along the wheel that varies substantially continuously from a first wavelength to a second wavelength as the filter wheel rotates.

Apparatus for projecting a wide-gamut-color image includes: a wide-spectrum image source; optics projecting light from the image source to a display surface along a light path; a filter unit interposed in the light path, constructed and arranged so as to allow individual wavelengths of the wide-gamut-color to pass through it in narrow bands of wavelengths having bandwidths narrower than a few tens of nanometers at each point in time; and a processor connected to the image source to present a sequence of images synchronous with each narrow-band wavelength passed by the filter at each point in time, thus projecting the wide-gamut-color image. According to a variation, the processor further presents plural sequences of images as a continuous video having individual frames each of which is a wide-gamut-color image. According to another variation, the filter unit further includes: beam splitting optics interposed in the light path, dividing the light path into a plurality of sub-paths; and a plurality of filters, each of the plurality of filters interposed in one of the sub-paths passing different, non-overlapping narrow-band wavelengths in an alternating sequence. In a further variation, the plurality of filters comprise a high-pass filter and a low-pass filter positioned relative to each other in order to set the bandwidth of the filter unit. In another further variation, one of the plurality of filters is a narrow-band filter interposed in one of the plurality of sub-paths; and another of the plurality of filters is a broad-band filter interposed in another of the plurality of sub-paths. In yet another variation, the filter further includes: a filter wheel having a narrow pass band that varies substantially continuously from a first wavelength to a second wavelength as the filter wheel rotates.

In the following description reference is made to the accompanying drawings, which form a part hereof, and in which are shown example implementations. It should be understood that other implementations are possible, and that these example implementations are intended to be merely illustrative.

DESCRIPTION OF THE DRAWINGS

Figure 1:
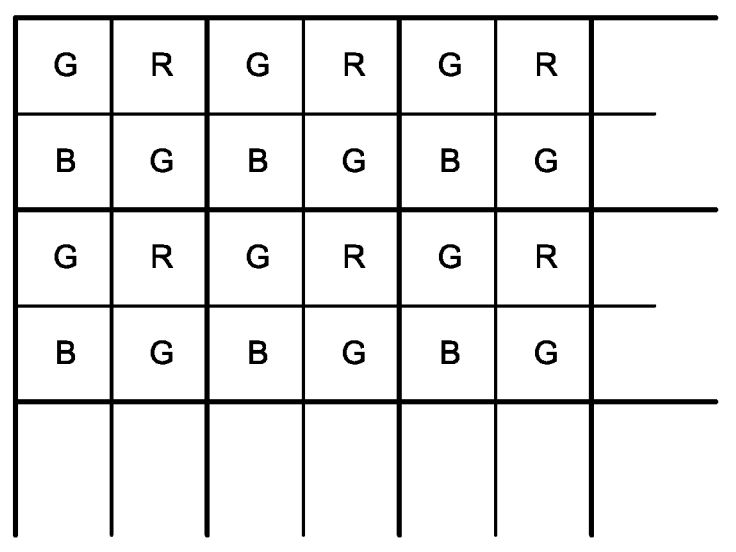

FIG. 1 is a plan view of a conventional Bayer color filter array.

FIGS. 8A, 8B, and 8C are an illustration of the configuration and functional spectrum of yet a further exemplary time-variable filter.

DETAILED DESCRIPTION

Figure 2:
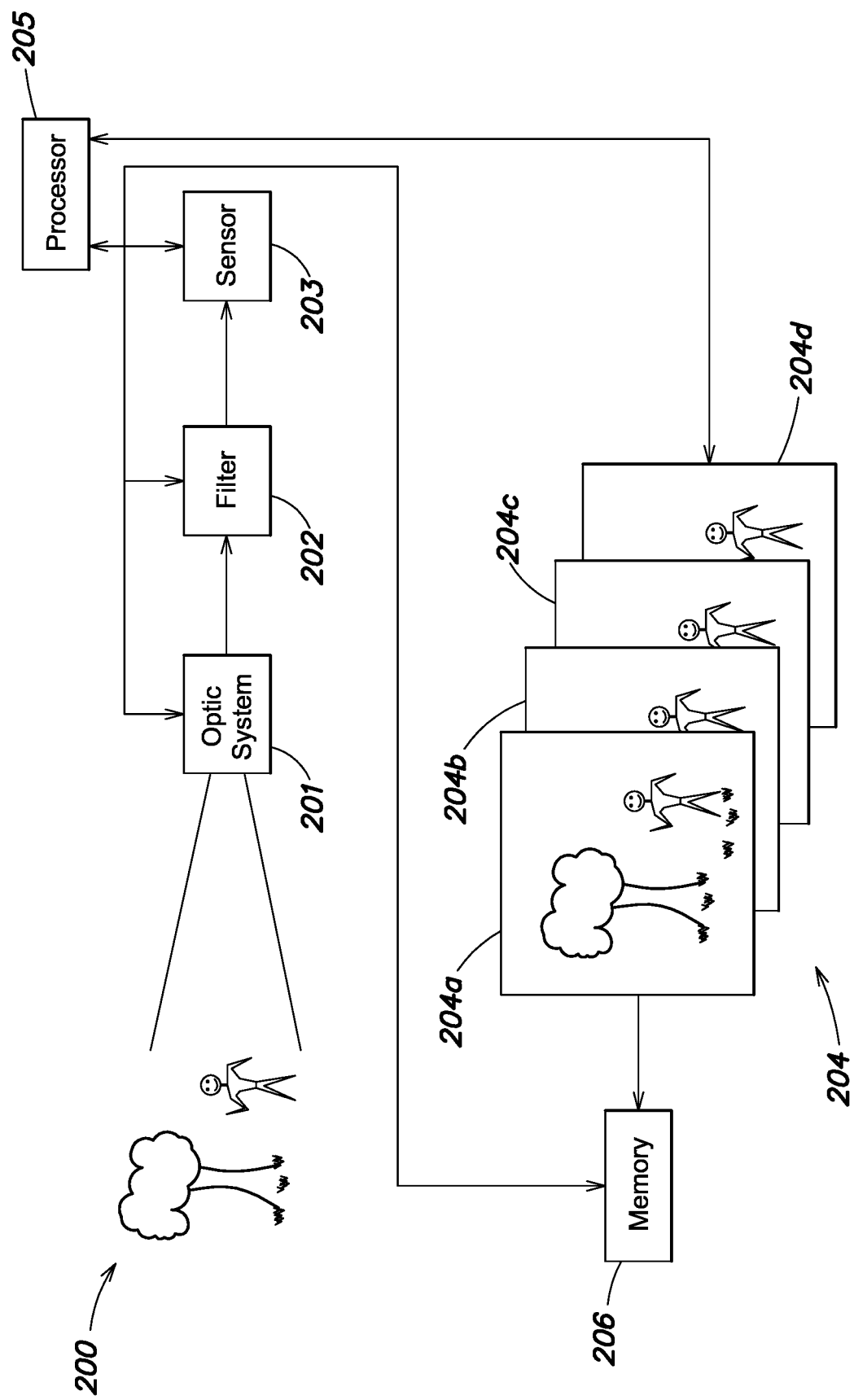
FIG. 2 is a schematic representation of an exemplary image capture device according to the invention.

The following section describes several exemplary embodiments of the invention and aspects thereof.

An exemplary image capture device according to the invention is now described with reference to the schematic of FIG. 2.

A broadband optical system 201 gathers light from a scene 200 of which an image 204 is to be captured. The broadband optical system 201 may be any suitable system of light gathering, focusing, and transmission elements, including lenses, prisms, mirrors, and the like.

A time-variable filter 202 selectively transmits substantially individual primary color frequencies. In practice, a so-called single-frequency, or single-color, filter may not transmit only one single color frequency, but may transmit a narrowband range of color frequencies approximating a single color frequency. Such a filter is to be considered a substantially single-frequency filter. The time-variable filter 202 cyclically varies over time in a predictable, known, or pre-set pattern. Examples of time-variable filters include a spinning color wheel having a continuously varying passband disposed along an arc of the wheel, an electronically-tunable thin-film filter such as a liquid crystal variable index filter, and a linear variable filter (LVF) such as those offered by Delta Optical Thin Film on the date of this writing. In each of these examples, and in other suitable filters, a center frequency of the pass band of the time-variable filter 202 should be controlled or indexed so that the color passed by the time-variable filter 202 at each point in time is known and other processes as will be described below can be synchronized with the time-varying frequency passed by the time-variable filter 202.

A broadband image sensor 203 collects intensity information at a focal plane for the individual primary color frequencies of the gathered and filtered light. The collection of image data by the broadband image sensor 203 is coordinated in time with the center frequency of the time-variable filter over time. Any of the time-variable filters 202 described above can be constructed and arranged to step through a set of three or more primary colors, or may vary continuously with time over a set of colors defined by a range of frequencies, the set of three or more colors defining the boundaries of a wide-gamut-color surface or other alternate-gamut-color surface (i.e., other than that defined by red, green, and blue primary colors), wherein such expanded or altered image spectral data improves low-light noise or image resolution performance. At each discrete sampling time of the broadband image sensor 203, the frequency passed by the time-variable filter 202 is known. Thus, a discrete image array 204a, 204b, 204c, 204d, containing color information for each of three or more primary colors can be collected. Such a collection of image arrays 204, representing information about three or more primary colors in the light collected from a scene can represent a wider gamut of color compared to conventional image arrays, if the three or more primary colors define such a wide-gamut-color surface or alternate-gamut-surface. Moreover, because each picture element need not be broken spatially into multiple primary-color-sensing regions, each light-gathering region can be larger than in a conventional sensor, improving low-light noise performance, or the number of discrete light-gathering regions of each color can be greater, improving resolution performance.

A processing system 205 controls and coordinates the operation of the broadband optical system 201, the time-variable filter 202, and the sampling times and operation of the sensor 203 to produce and store image arrays 204. For example, the processor 205 records image arrays 204 at each time when the time-variable filter 202 has been controlled to pass, or has been detected to be passing light at one of the three or more primary color frequencies defining the wide-gamut-color desired. In such a system, the processor 205 will need to process out aberrations such as produced by a rotating filter, in which multiple colors may be hitting the array at one time if individual color segments on the filter are smaller than the size of the entire sensor. Also, as the filter rotates between colors, this will be the case because, presumably, the sensor will continue to capture image data during that transition time—like skew and other rolling-shutter artifacts on conventional cameras. The processor 205 stores the image arrays 204 in memory 206. The processor 205 may, in addition to processing out the aberrations discussed above, also perform other conventional image processing tasks, such as adjusting the broadband optical system 201 for focus or performing adjustments on the image arrays 204 such as compensating for color or focus aberrations in the broadband optical system 204 or making user-directed exposure and color adjustments.

An exemplary image production device according to the invention is described with reference to the schematic of FIG. 3.

Collections of image arrays 204 are stored in a memory 306. Each image array 204a, 204b, 204c, 204d, represents one color of three or more primaries defining a wide-gamut-color. A processor 305 converts the collection of image arrays 204 into signals representing luminance of each primary color at each pixel in the image to be produced.

An image production system based on one or more broad spectrum light sources 307 responds to the signals to vary the luminosity of each pixel in a time sequence coordinated with a time-variable filter 302 that selectively transmits three or more substantially single-frequency primary color frequencies.

In one embodiment, based on a single broadband light source 307, the time-variable filter 302 is controlled to pass one of the three or more colors by which the scene to be displayed is represented. The broadband light from the source 307 is passed in series, in either order, through the filter 302 and also through a neutral density array 303 that is controlled to define the luminosity of the color selected by the filter at each point in the scene. These functions may be combined into the time-variable filter device. In another embodiment, individual broadband light source elements are illuminated in the array luminosity pattern for each primary color in sequence. A time-variable filter over the light source array is sequenced to cause each primary color to be projected or displayed in coordination with the luminosity patterns in which the broadband light source elements are illuminated. Yet another embodiment may include individual, picture-element level, narrowband light sources each illuminated in sequence, such as done in conventional LED-based pico-projectors, or in arrays which are then combined into a single image by beam-combining optics. The individual, narrowband light sources of such an embodiment would include three or more primary colors defining the boundaries of a wide-gamut-color surface or other alternate-gamut-color surface (i.e., other than that defined by red, green, and blue primary colors), as mentioned above.

Figure 3:
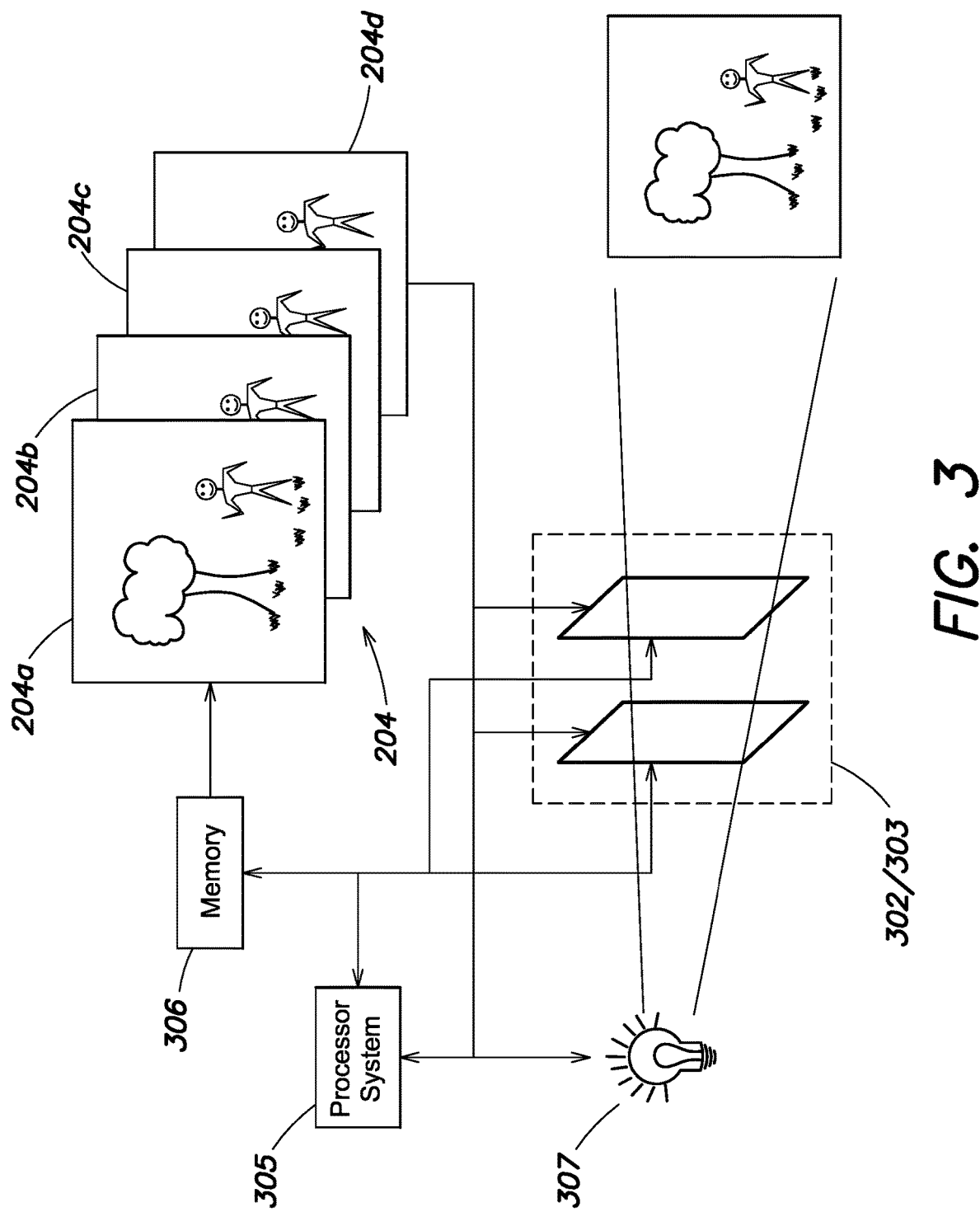
FIG. 3 is a schematic representation of an exemplary image projection or display device according to the invention.
Figure 4:
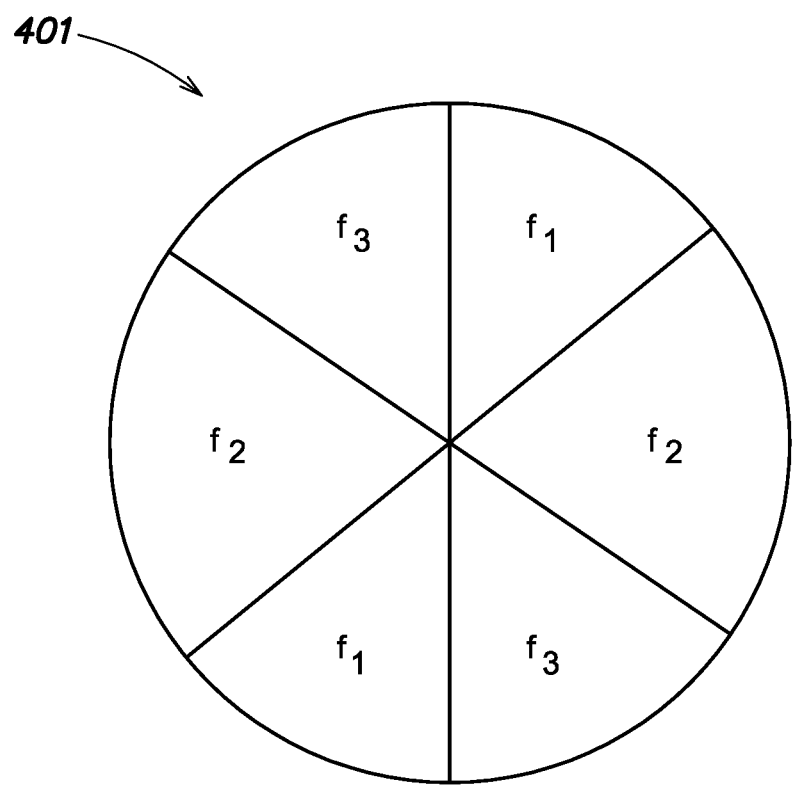
FIG. 4 is a plan view of an exemplary filter wheel usable as a time-variable filter.

Referring to FIG. 4, a first exemplary variable filter usable in the systems of FIGS. 2 and 3 is now described. A band-pass filter wheel 401 may be comprised of plural segments f having pass band center frequencies f1, f2, f3, of different primary colors disposed about an arc of the wheel, or of a continuously varied pass band disposed about an arc of the wheel. In both of these cases, at each point along the arc of the wheel, the optical color pass-band of the wheel is known. The wheel may be small or large, and may be driven by any suitable conventional motor or micro-motor to suit the size of the wheel and the sensor to which light passing through the wheel is directed.

Figure 5:
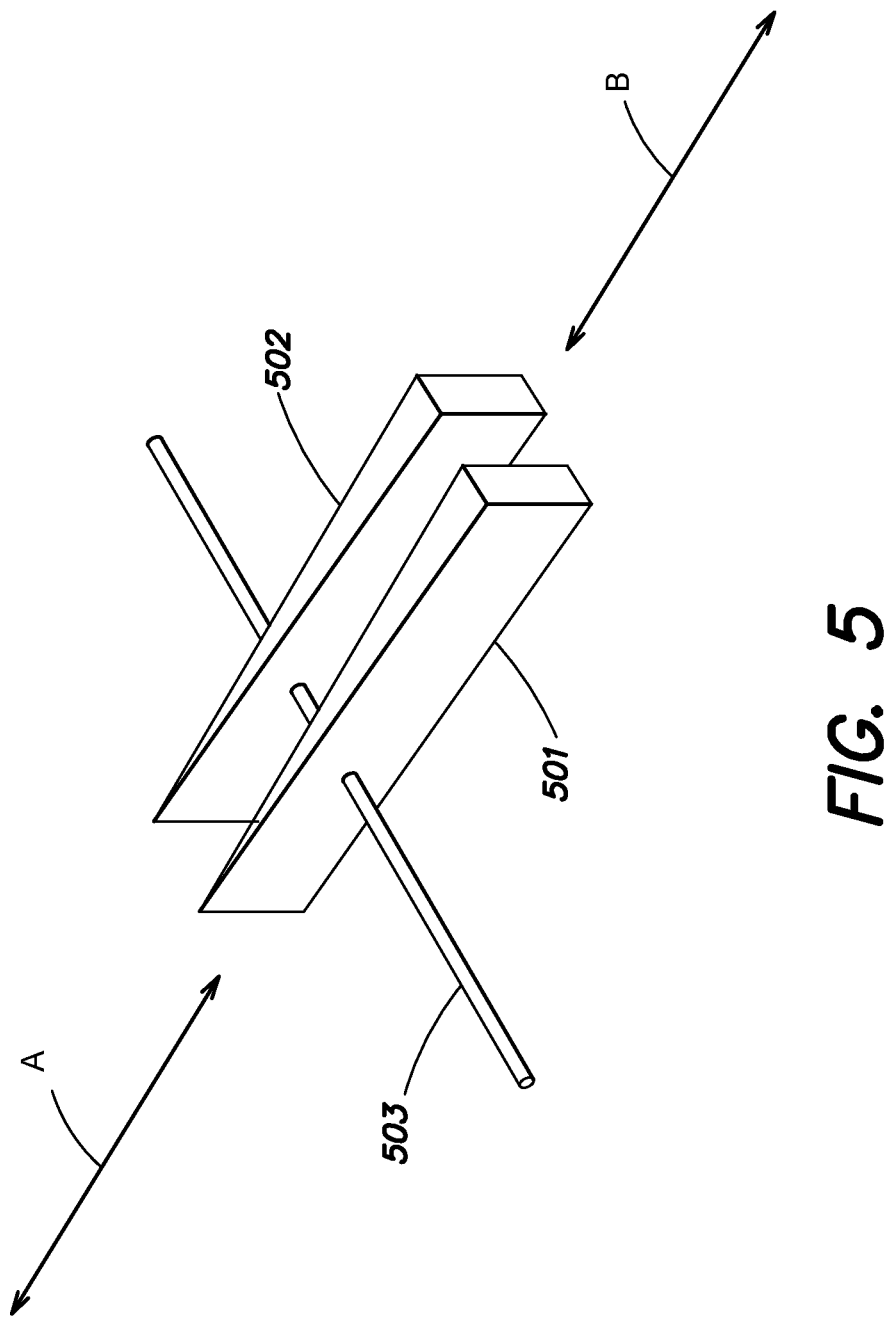
FIG. 5 is a perspective view of another exemplary time-variable filter.

Referring to FIG. 5, a second exemplary variable filter usable in the systems of FIGS. 2 and 3 is now described. An electronically variable solid-state filter available on the filing date of this application from Knight Optical of Kent, England, includes two variable-index filter elements 501 and 502. In order to set the bandwidth of the filter unit, electronic motive elements such as motors or piezoelectric elements (not shown) move the filter elements 501 and 502 horizontally A (rotationally in the case of a filter wheel) relative to each other. In order to set the center frequency of the filter unit, electronic motive elements such as motors or piezoelectric elements (not shown) move the filter elements 501 and 502 horizontally B (rotationally in the case of a filter wheel) in unison with each other.

Figure 6:
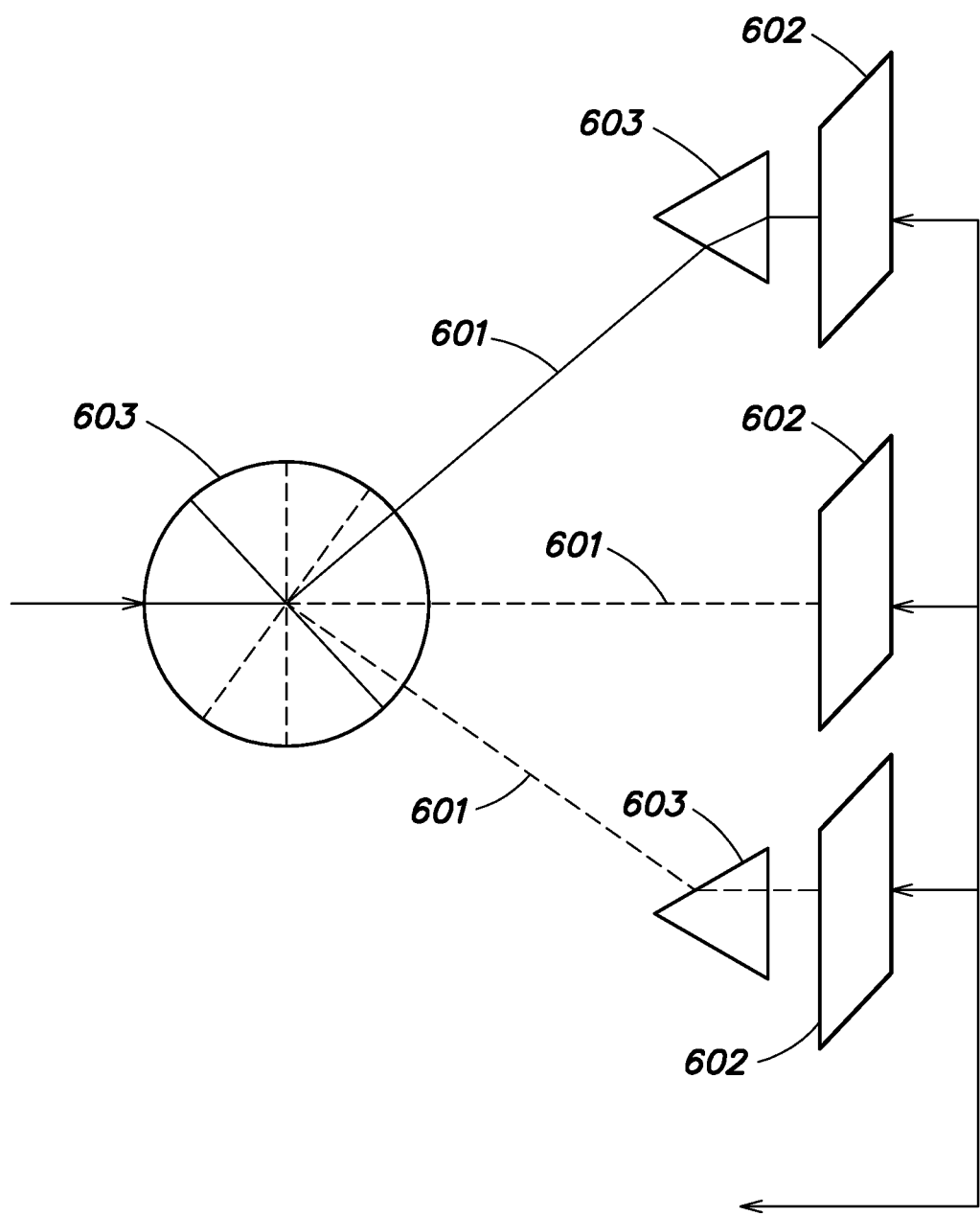
FIG. 6 is a schematic representation of yet another exemplary time-variable filter.

Referring to FIG. 6, a third exemplary time-variable filter (FIG. 2, 202; FIG. 3, 302) usable in the systems of FIGS. 2 and 3 is now described. Plural optical paths 601 in each of which is interposed any suitable single-frequency, or a variable frequency filter 602 for example as described above, sequentially receive light from the broadband optics (FIG. 2, 201) or broadband light source (FIG. 3, 307). Light may be steered down each of the optical paths 601 by any suitable optical steering mechanism 603, such as micromirrors, prisms, variable-index materials, and diffraction materials.

Figure 7:
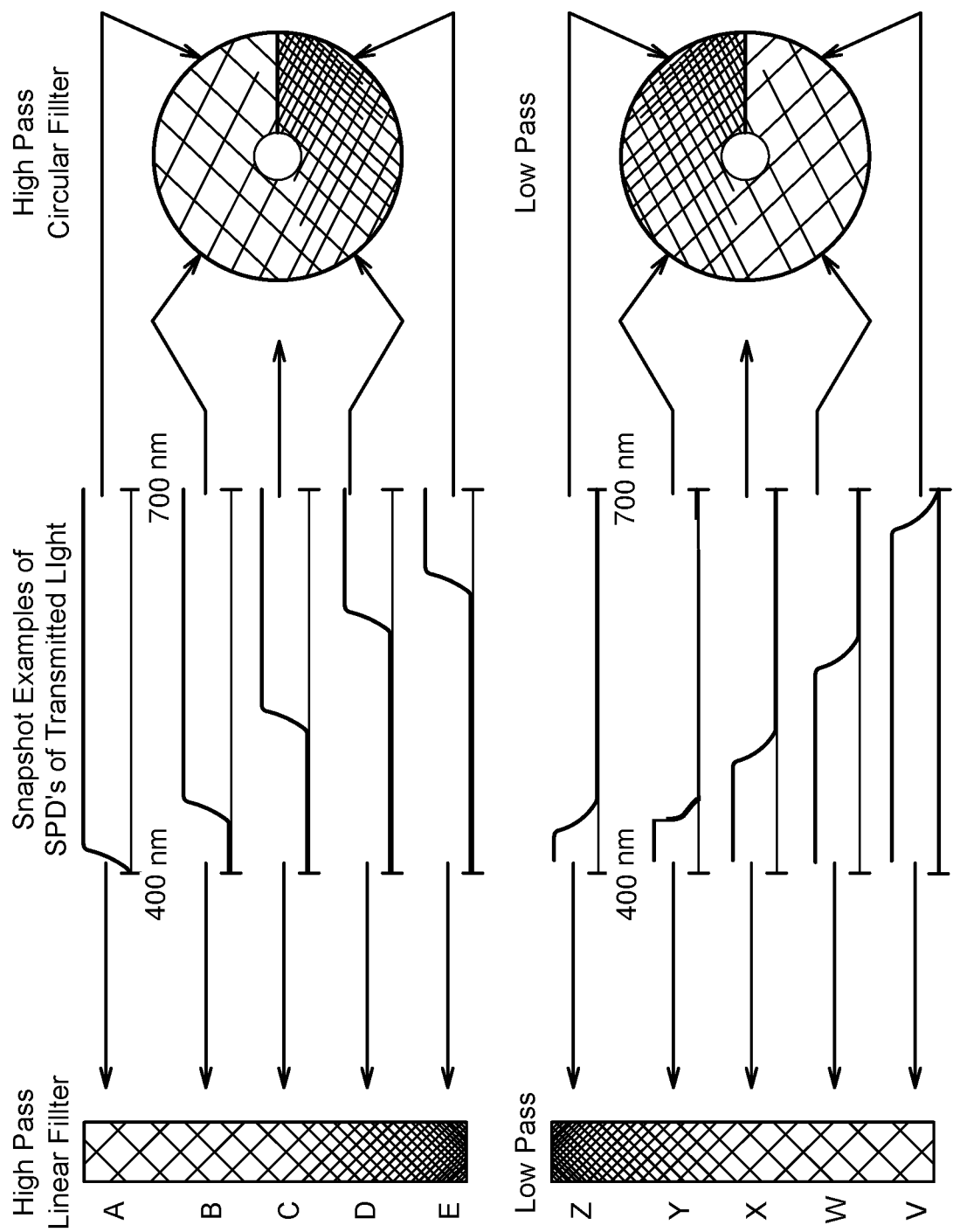
FIG. 7 is an illustration of the configuration and functional spectrum of a further exemplary time-variable filter.

Now, additional embodiments of filter systems for forming or projecting wide-gamut images are described in connection with FIGS. 7-10C. The filter systems of these embodiments include two filter elements—one a high-pass filter, and one a low-pass filter—each having a cut-off frequency that varies from one location on the filter to another. FIG. 7 shows a linear type of filter on the left, and a circular type on the right. Either type can be arranged for the cut-off frequency to vary linearly, non-linearly, stepwise, or in any other suitable, continuous function from one location on the filter to another. In the case of the linear type on the left, the cut-off frequency can vary from one end of the filter element to the opposite end. For example, on the high-pass filter points A, B, C, D, and E, denote points along the continuum of the filter where the cut-off frequency varies from about 400 nm at point A, to about 700 nm at point E. Continuing with this example, on the low-pass filter points V, W, X, Y, and Z, denote points along the continuum of the filter where the cut-off frequency varies from about 700 nm at point V to about 400 nm at point Z. The circular filters shown on the right are similarly arranged from a point on one side of a reference line to a point on an opposite side of the reference line. Both the linear and circular filters are arranged with cut-off frequencies overlying (A-B-C-D-E vs Z-Y-X-W-V, as shown in FIGS. 7, 8A, 8B, 8C, 9A, 9B, 10A, 10B, and 10C).

In practical applications, a pair of filters is arranged in a suitable configuration, such as one of those shown in FIG. 8A, 8B, 8C, 9A, 9B, 10A, 10B, or 10C. These configurations are now explained in greater detail.

In FIGS. 8A, 8B, and 8C, a single, variable-bandwidth filter is shown, as follows. FIG. 8A illustrates the effect of aligning regions B and W of the high-pass and low-pass filters to form a region of medium bandwidth. A region of wide bandwidth is formed by aligning regions A and V of the high-pass and low-pass filters, as illustrated in FIG. 8B. At the other extreme, aligning regions C and X forms a region of narrow bandwidth, as illustrated in FIG. 8C.

Figure 9A:
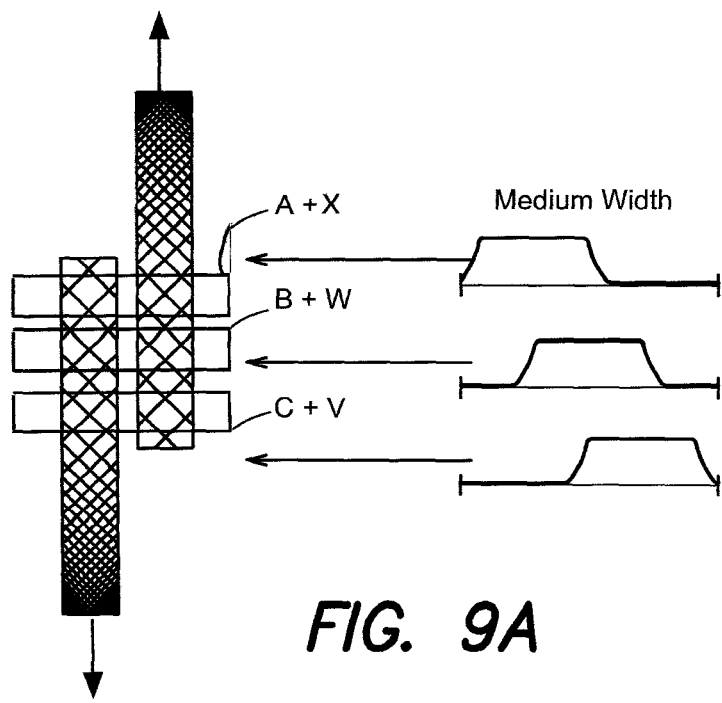
FIGS. 9A and 9B are an illustration of the configuration and functional spectrum of yet another further exemplary time-variable filter.
Figure 9B:
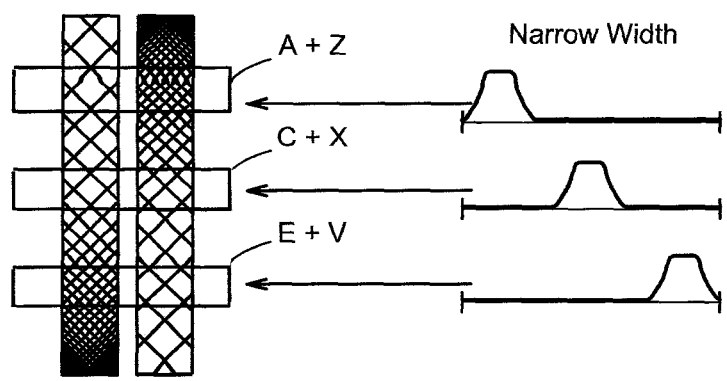

In FIGS. 9A and 9B, a single filter unit of a linear type provides plural pass bands having medium or narrow bandwidths, as follows. FIGS. 9A and 9B show that similar configurations to those shown in FIGS. 8A, 8B, and 8C can be used to produce multiple medium and narrow pass bands, such as may be required for wide-gamut-color systems. As shown In FIG. 9A, with one positional alignment, the pairs of regions A and X, B and W, and C and V align to pass medium bandwidth bands of color across the visible spectrum. By shifting the alignment of the filters as shown in FIG. 9B, the pairs of regions A and Z, C and X, and E and V align to pass medium bandwidth bands of color across the visible spectrum. Other positions can produce other bandwidth filters In some practical application of the invention, the filter elements may be moved relative to the beam path, either separately or as a unit, to vary the bandwidth and to vary the center frequency of the pass band respectively. Alternatively, the beam can be steered, for example by a Digital Light Processing® (DLP®) mirror array (a Texas Instruments Incorporated product) that can steer a beam through an angle of about ±12°, another suitable array of steerable micromirrors, or any other suitable system. In another alternative, the individual mirrors could be imprinted or coated with diffraction gratings or holograms having similar properties, to further separate or direct light of selected pass bands onto individual paths as required to produce a desired image pattern.

Figure 10A:
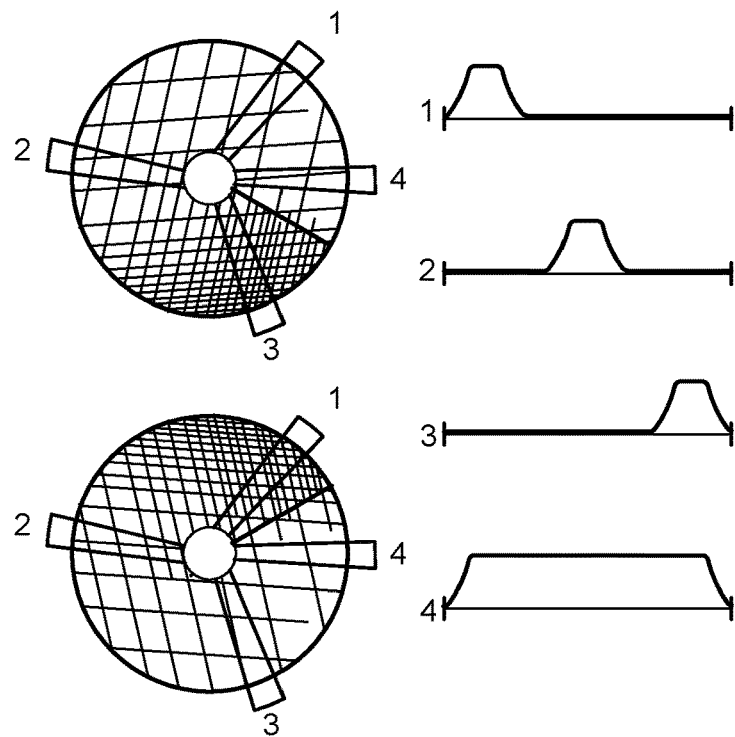
FIGS. 10A, 10B, and 10C are an illustration of the configuration and functional spectrum of even yet another further exemplary time-variable filter.
Figure 10B:
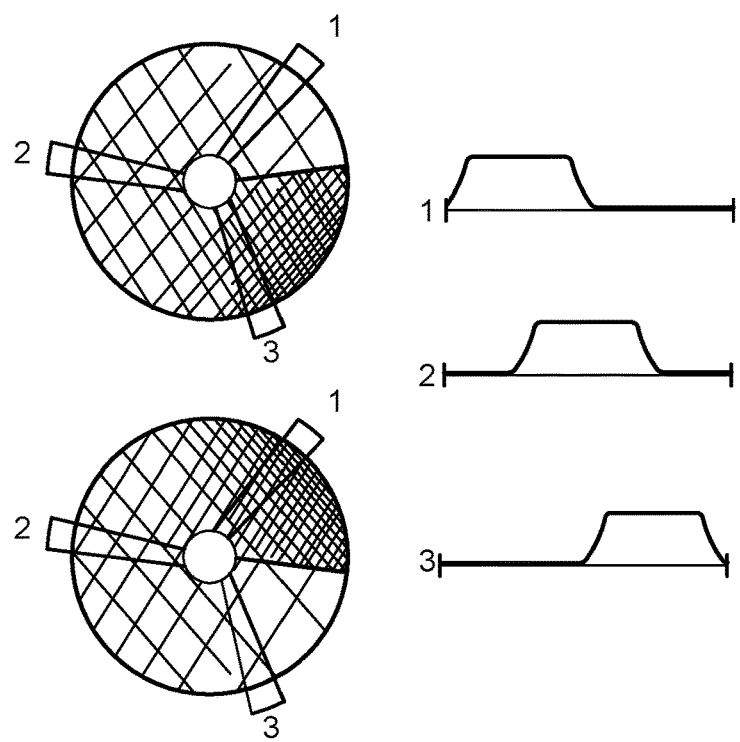
Figure 10C:
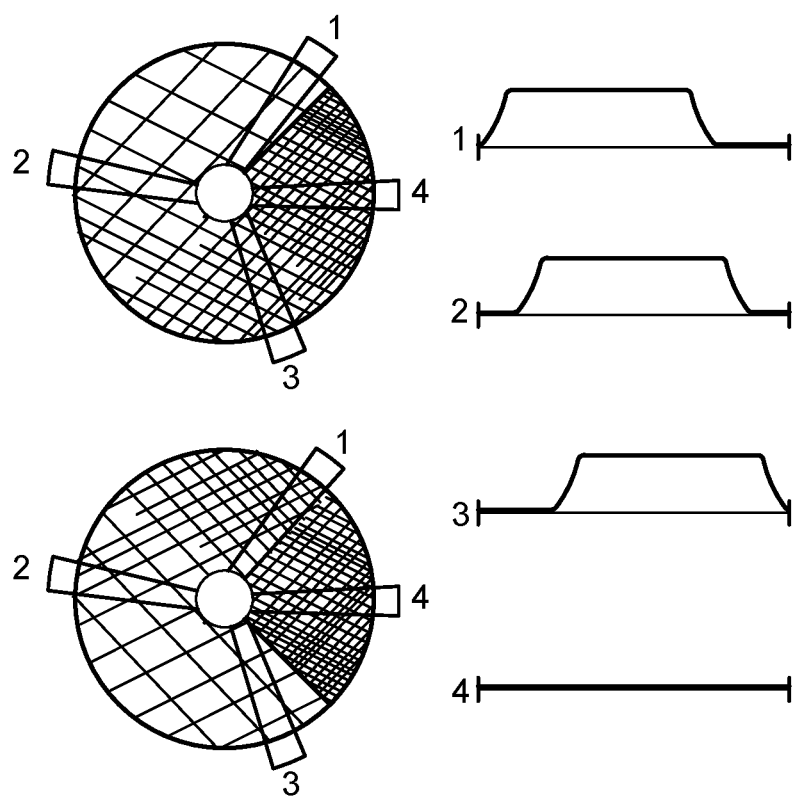

In FIGS. 10A, 10B, and 10C, a single filter unit of a circular type provides plural pass bands having narrow, medium, or wide bandwidths similar to the linear type filter unit of FIGS. 9A and 9B. One advantage of circular filter configurations is that the assembly can be easily rotated at high or low speed to cause a stationary light path to be filtered by a continuously variable filter over time. The two circular filters—one high-pass (HP) and one low-pass (LP), similar to those shown to the right in FIG. 7—are overlaid in either fixed or variable relationship, to produce either a narrow-band, continuously variable filter as in FIG. 10A, or a medium-band, continuously variable filter as in FIG. 10B, or a wide-band, continuously variable filter as in FIG. 10C. In FIG. 10A, the regions 1 of the HP and LP filters align to produce a narrow, high, band pass region, the regions 2 of the HP and LP filters align to produce a narrow, middle, band pass region, and the regions 3 of the HP and LP filters align to produce a narrow, low, band pass region. Regions 4 align to pass most of the wide-band light from the source. By comparison, in FIG. 10B, as a result of the differing alignment and positioning of the regions, the regions 1 of the HP and LP filters align to produce a medium-width, high, band pass region, the regions 2 of the HP and LP filters align to produce a medium-width, middle, band pass region, and the regions 3 of the HP and LP filters align to produce a medium-width, low, band pass region. Using yet a different alignment, as shown in FIG. 10C, the regions 1 of the HP and LP filters align to produce a wide, high, band pass region, the regions 2 of the HP and LP filters align to produce a wide, middle, band pass region, and the regions 3 of the HP and LP filters align to produce a wide, low, band pass region. Regions 4 align to pass substantially none of the wide-band light from the source.

Each of the filters of this circular type may optionally include a blackout region (not shown), or may when overlapped include a naturally occurring zone as described above (Region 4) to either or both sides of the line where the filter cut-off frequencies abruptly transition from the highest to lowest, or lowest to highest, frequency.

Image and video recording and projecting systems commonly operate at frame rates of 24, 30, 60, and 120 fps. The filter center frequency must be varied fast enough to scan the entire frequency range, over the entire frame, within each frame time. Small circular filters can be rotated at great enough speeds. A system that locks the relative positions of the two filters would reduce alignment variation, while permitting the combined filter to be rotated at a suitable speed.

Broadband lamp technology presents issues of lamp longevity and efficiency that further affect filter design and use. Current, high-output lamps are quartz envelope bulbs containing a gas, excited by radio frequency (RF) energy. An available alternative is laser sources. An array of laser sources or tunable structures could provide a wide-bandwidth source. A multiple-primary array of colored lasers, scrambled together and directed onto a DLP mirror array could produce a filterable, wide-bandwidth source. One advantage of a multi-primary, wide-bandwidth source such as described and used in connection with the variable bandwidth and variable center frequency filter described is that more of the source light is captured and used.

In a further possible configuration, a DLP array with mirrors having dichroic coatings that vary light color as the mirrors are tilted could be used to implement the variable filter system. Two DLP arrays could implement the beam steering and high-pass/low-pass combination of filters as described above with lower source light loss due to fewer optical elements in the beam path.

Figure 11:
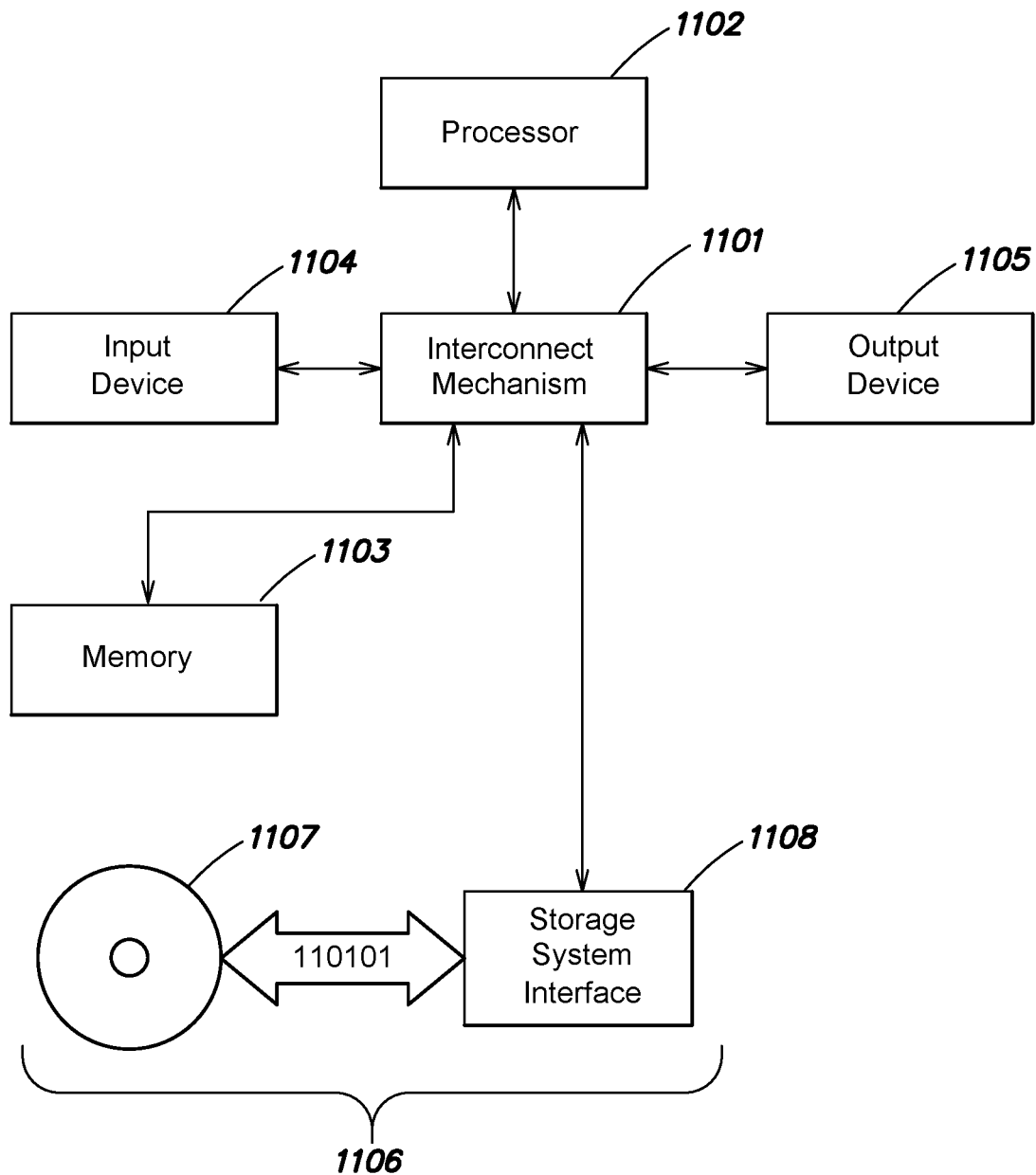
FIG. 11 is a schematic representation of a control system for the systems of FIGS. 2 and 3.

Referring to FIG. 11, the processing system (FIG. 2, 205; FIG. 3, 305) synchronizes the operation of the sequential filtering mechanism selected with the capture of primary color information (in an image capture device) or the production of primary color information (in an image production device). The processing system includes several elements connected by an interconnect mechanism 1101, some of which are optional. Central to the processing system is a processor 1102, which may be any suitable CPU, GPU, DSP, microprocessor, combination of these, or similar. The processor 1102 is supported by memory 1103, which typically holds data and instructions with which the processor 1102 is currently working. In the systems described herein, the memory 1103 may hold image arrays 204 or portions thereof while processor 1102 is performing operations thereon, for example. Users of an image capture system, for example, may optionally use an input device 1104 to configure and control the system, and an output device 1105 to monitor the configuration and operation of the system. The system may include a long-term storage system 1106 for holding image arrays 204, program instructions (not shown) or other data used by the system. A long-term storage medium 1107, which is a substantially non-transient storage element, such as solid-state storage media, various types of R/W disks, and other suitable non-transient media is connected to the system through a storage system interface 1108.

Numerous variations of the invention will now be apparent to the skilled artisan. Such variations expressly include other combinations of the examples given above, where suitable. Described variations of the invention are intended to be considered exemplary, and will suggest to the skilled artisan those categories of elements suitable for use in other embodiments of the claimed invention coming within the scope of the following claims.

What is claimed is:

1. Apparatus for capturing a wide-gamut-color image comprising:
   a broadband electronic image sensor;
   optics gathering light from a scene and focusing an image formed by the gathered light along a light path onto the electronic image sensor;
   a filter interposed in the light path, constructed and arranged so as to allow individual wavelengths of the wide-gamut-color to pass through it in narrow bands of wavelengths having bandwidths narrower than a few tens of nanometers at each point in time; and
   wherein the filter further comprises:
   a filter wheel having three or more regions, each having a narrow pass band centered on a wavelength defining an apex of a wide-gamut-color surface; and
   a processor connected to the image sensor to capture a sequence of images synchronous with each narrow-band wavelength passed by the filter at each point in time, the processor combining the sequence of images into the wide-gamut-color image.

2. The apparatus of claim 1, wherein the filter is constructed and arranged so as to allow three or more individual wavelengths of the wide-gamut-color to pass through it in narrow bands of wavelengths having bandwidths narrower than a few tens of nanometers at each point in time.

3. The apparatus of claim 2, wherein the filter is constructed and arranged so as to allow each individual narrow band of wavelength of the wide-gamut-color continuous surface to pass through it individually at separate points in time.

4. The apparatus of claim 1, wherein the processor further combines plural sequences of images into a continuous video having individual frames, each of which is a wide-gamut-color image.

5. The apparatus of claim 1, the filter further comprising:
   beam splitting optics interposed in the light path, dividing the light path into a plurality of sub-paths; and
   a plurality of filters, each of the plurality of filters interposed in one of the sub-paths passing different, narrow-band wavelengths in an alternating sequence.

6. The apparatus of claim 5, wherein the plurality of filters comprise a high-pass filter and a low-pass filter.

7. The apparatus of claim 5, wherein the plurality of filters further comprise:
   a mounting structure constructed and arranged to move at least one of the plurality of filters relative to another of the plurality of filters to set at least one of a bandwidth and a center frequency of the filter unit.

8. The apparatus of claim 1, wherein the filter wheel further comprises:
   a narrow pass band region at each radial position along the wheel that varies substantially continuously from a first wavelength to a second wavelength as the filter wheel rotates.

9. Apparatus for transporting a wide-gamut-color image, comprising:
   an image source;
   optics projecting light from the image source to an image destination along a light path;
   a filter unit interposed in the light path, constructed and arranged so as to allow individual wavelengths of a wide-gamut-color to pass through it in narrow bands of wavelengths having bandwidths narrower than a few tens of nanometers at each point in time; and
   wherein the filter further comprises:
   a filter wheel having three or more regions, each having a narrow pass band centered on a wavelength defining an apex of a wide-gamut-color surface; and
   a processor connected to only one of the image source and the image destination to produce a sequence of images at either the image source or the image destination, the sequence of images synchronous with each narrow-band wavelength passed by the filter at each point in time.

* * * * *